United States Patent [19]

Duarte

[11] Patent Number: 4,891,817
[45] Date of Patent: Jan. 2, 1990

[54] PULSED DYE LASER APPARATUS FOR HIGH PRF OPERATION

[75] Inventor: Francisco J. Duarte, Rochester, N.Y.

[73] Assignee: Eastman Kodak Company, Rochester, N.Y.

[21] Appl. No.: 205,763

[22] Filed: Jun. 13, 1988

[51] Int. Cl.⁴ .............................................. H01S 3/20
[52] U.S. Cl. ...................................... 372/54; 372/20; 372/30; 372/53; 372/97
[58] Field of Search ....................... 372/54, 53, 72, 97, 372/18, 20, 98, 70, 25, 30, 51, 73

[56] References Cited

U.S. PATENT DOCUMENTS

| | | | |
|---|---|---|---|
| 3,873,941 | 3/1975 | Yarborough et al. | 331/94 |
| 3,906,399 | 9/1975 | Dienes et al. | 372/53 |
| 3,913,033 | 10/1975 | Tuccio et al. | 331/94 |
| 4,013,978 | 3/1977 | Burlamacchi et al. | 331/94 |
| 4,255,718 | 3/1981 | Herbst | 372/53 |
| 4,751,712 | 6/1988 | Bax et al. | 372/54 |

OTHER PUBLICATIONS

Gutfeld; "Multicolored Laser—Displays"; IBM Technical Dislosure Bulletin; vol. 16, No. 9; 02/1974; pp. 3123-3124.
Hargrove et al; "High Power—Lasers"; IEEE Journal of Quantum Electronics, vol. QE-16, No. 10; 10/1980; pp. 1108-1113.
Duarte et al; "Diffraction—Amplifier System"; Applied Optics, vol. 26, No. 13; 07/01/1987; pp. 2567-2571.
Duarte/Piper; "A Double-Prism Beam Expander For Pulsed Dye Lasers"; Oct. 1980; Optics Communications; vol. 35; No. 1.
Durate/Piper; "Narrow Line Width High PRF Copper Laser-Pumped Dye-Laser Oscillators", May 1984; Applied Optics, vol. 23; No. 9; 1 May 1984; pp. 1391-1394.

Primary Examiner—Frank Gonzalez
Attorney, Agent, or Firm—Donald D. Schaper

[57] ABSTRACT

Laser apparatus is disclosed which comprises a compact pulsed dye laser for high pulse repetition frequency operation. The pulsed dye laser includes a resonator cell having a passageway through which dye solution is circulated and a pump laser for optically pumping the resonator. In order to provide laser apparatus which is capable of very high performance, the dye solution is circulated through a narrow passageway at high flow rate and the pump laser is operated at a high pulse repetition frequency.

4 Claims, 2 Drawing Sheets

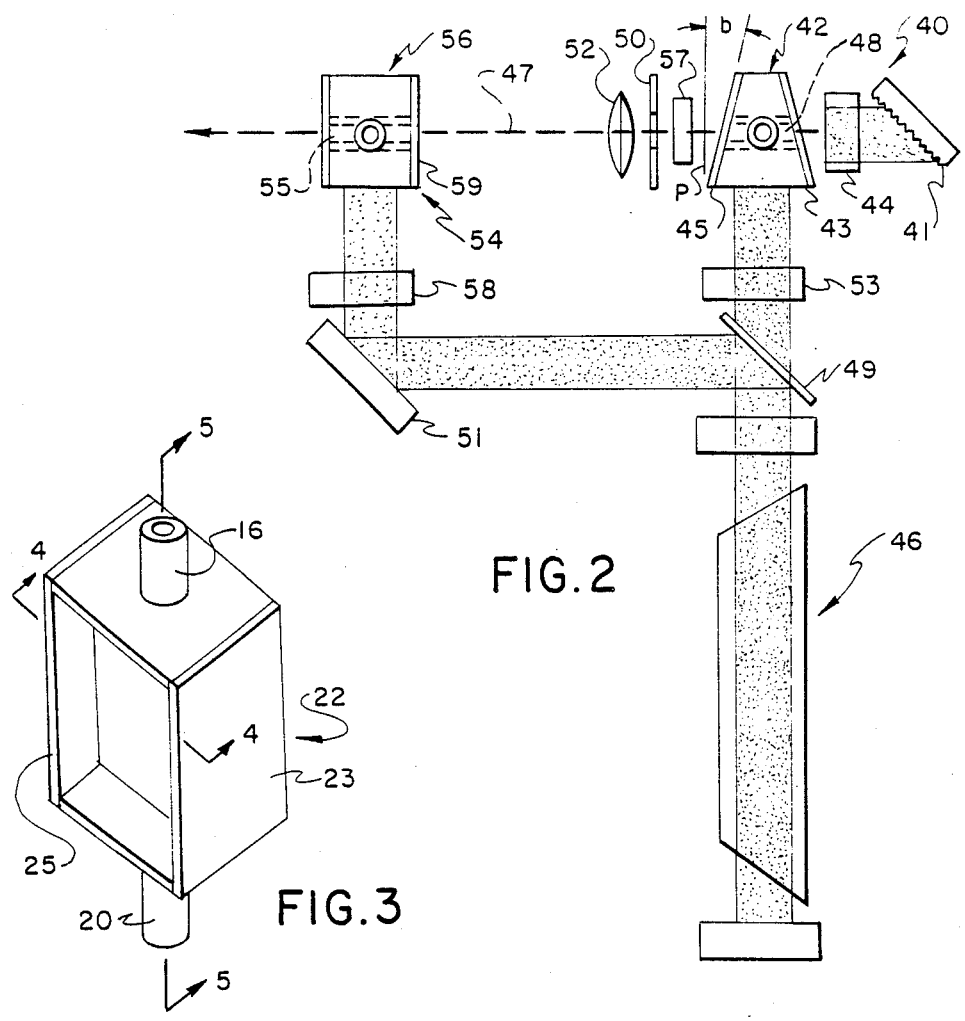
FIG. 2
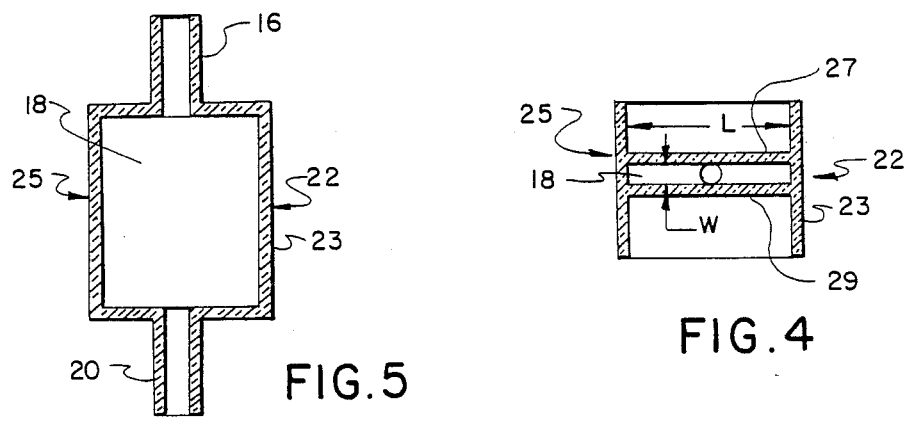
FIG. 3
FIG. 4
FIG. 5

PULSED DYE LASER APPARATUS FOR HIGH PRF OPERATION

BACKGROUND OF THE INVENTION

1. Field of the Invention

The present invention relates to a laser apparatus, and more particularly, to apparatus which includes a compact pulsed dye laser for high pulse repetition frequency (prf) operation.

2. State of the Prior Art.

Dye lasers are particularly advantageous for certain laser applications because they can provide output wavelengths over relatively large segments of the visible spectrum. This is in contrast to most lasers which are only capable of providing strong output wavelengths at a limited number of discrete wavelengths. In all lasers, the active lasing material must be "pumped" to elevated excitation levels. In the case of a dye laser, this pumping excitation is accomplished optically. That is, energy in the form of electromagnetic energy in the optical region of the spectrum is directed at the dye. This includes not only energy in the visible part of the electromagnetic spectrum, but, also, energy in the infrared and ultraviolet portions of the spectrum.

In U. S. Pat. No, 4,013,978, there is disclosed a dye laser for use in photocoagulation therapy in which a solution of active dye is pumped through a cell. The cell is closed at one end by a polished stainless steel sheet and at an opposite end by a partially-silvered mirror which forms the outlet window. Dye solution from a reservoir is slowly circulated through the cell to produce a gradual change of the dye solution in the cell and to equalize the temperature difference between the solution in the cell and the reservoir. Flash tubes on opposite sides of the cell are energizable to optically pump the cell, that is to stimulate emission of radiation in the active material in the cell. A problem with this dye laser is that the flashlamps are operated at a frequency which is too low for many applications. Further, if an attempt were made to operate the apparatus at a higher frequency, the slowly-circulating dye solution would be heated to a point where chemical breakdown of the dye would occur.

A copper laser-pumped dye laser which operates at a high prf is disclosed in an article entitled "Narrow linewidth, high prf copper laser-pumped dye-laser oscillators, " by F. J. Duarte and J. A. Piper, Applied Optics, Vol. 23, No. 9, May 1, 1984. This laser utilizes a dye cell which is triangular in cross section, and dye solution is circulated through the cell at a velocity of approximately 5 msec$^{-1}$ in a direction transverse to the optical axis. The copper vapor laser, used as the pump source, was operated to produce pump pulses of 20–30 nsec in duration. Although such a device is capable of high performance, it has been recognized that it would be desirable to operate at even higher pulse repetition frequencies. For example, in applications such as spectroscopy, the faster the pulse rate the faster data can be collected.

SUMMARY OF THE INVENTION

It is an object of the present invention to overcome the problems in the prior art noted above and to provide improved laser apparatus.

In accordance with one aspect of the invention, there is provided laser apparatus for producing a laser beam along an optical axis, the apparatus comprising: a resonator cell, the cell having a first wall which is totally reflective and a second wall which is partially reflective, and the cell further including a narrow passageway between the walls for receiving a dye solution; means for delivering a dye solution to the passageway at a high pressure; a pump laser, the pump laser having means for delivering a pump laser beam to the cell in a direction transverse to the optical axis, the pump laser delivering the pump laser beam at a pulse rate frequency greater than 5,000 pulses per second.

In one embodiment of the present invention, the laser apparatus includes a compact pulsed dye laser for high pulse frequency operation. The dye laser includes a resonator cell in which the walls of the cell act as mirrors. A dye solution is pumped through a narrow passageway in the cell at a high velocity. The dye laser is optically pumped by a high pulse repetition frequency laser.

The apparatus of the present invention is particularly applicable to laser operation at high pulse repetition frequencies. The apparatus is very compact, highly efficient, simple to use, and is relatively inexpensive to manufacture. The simplicity of the apparatus makes it especially suitable for medical applications such as cancer diagnosis and cancer phototherapy. One example of such an application is disclosed in commonly-assigned U.S. Pat. Application Ser. No. 028,991, (now abandoned) entitled Two-Laser Therapy and Diagnosis Device, filed in the name of F. J. Duarte, on Mar. 23, 1987. The dye laser in the present invention is tunable from 350nm to 1000 nm, depending on the dye used and on the laser pump, and dispersive elements can be easily incorporated for single mode operation. A further advantage is that the dye solution is totally self contained, and no jets are necessary to achieve the high velocity of the dye solution.

Other features and advantages will become apparent with reference to the following Description of the Preferred Embodiments when read in light of the attached drawings.

BRIEF DESCRIPTION OF THE DRAWINGS

FIG. 2 is a top plan view of a second embodiment of the present invention;

FIG. 3 is a perspective view of the resonator cell;

FIG. 4 is a sectional view, taken along the line 4—4 in FIG. 3.

FIG. 5 is a sectional view, taken along the line 5—5 in FIG. 3;

DESCRIPTION OF THE PREFERRED EMBODIMENT

Figures 1, 6:
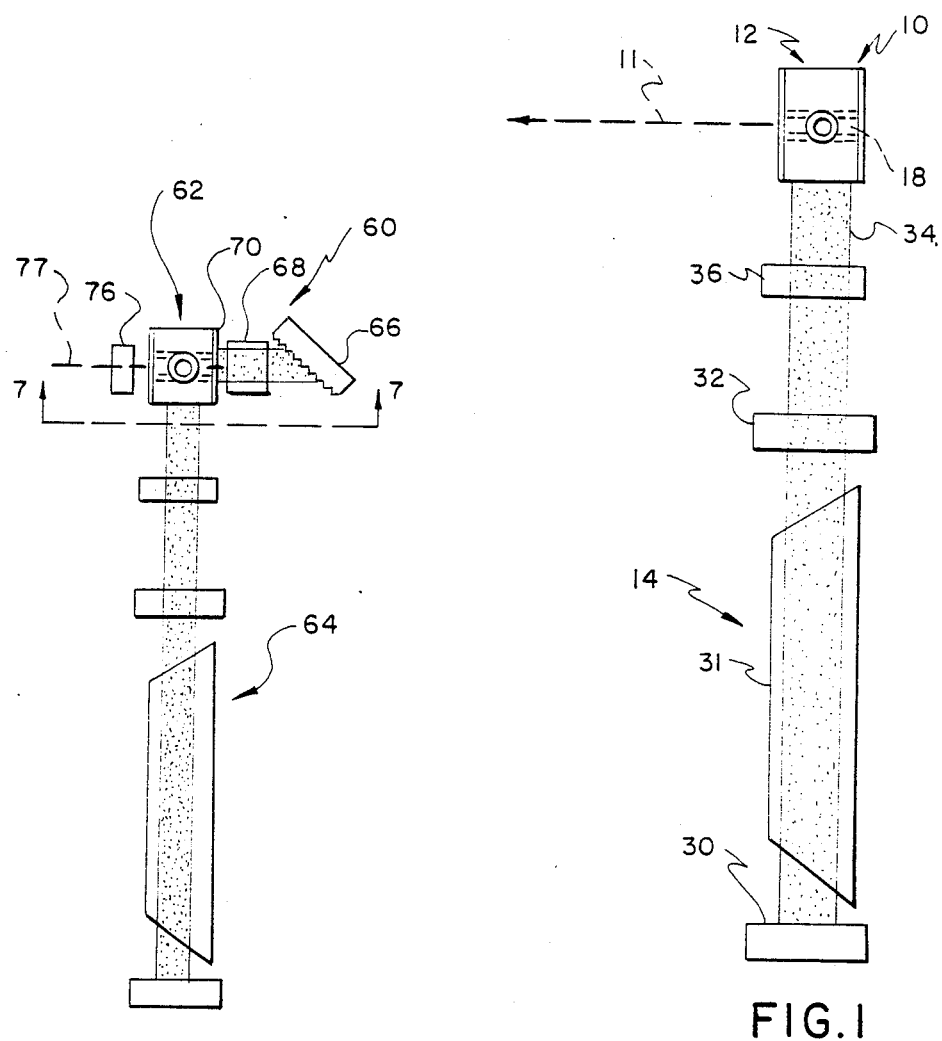
FIG. 1 is a top plan view of one embodiment of the present invention.
FIG. 6 is a top plan view of another embodiment of the present invention.

With reference to FIG. 1, there is shown laser apparatus 10 constructed in accordance with the present invention. Laser apparatus 10 is adapted to produce a laser beam along an optical axis indicated at 11. Apparatus 10 comprises a resonator cell 12 and a pump laser 14 for optically pumping a dye solution in the cell 12.

Resonator cell 12 is best shown in FIGS. 3—5 and comprises a passageway 18, an inlet 16 through which dye solution from a pump (not shown) is delivered to passageway 18, and an an outlet 20 through which dye solution from passageway 18 returns to the pump. A wall 22 forms one reflective window of resonator cell 12. Wall 22 is coated on an outer surface 23 with a broadband reflective material such as aluminum which makes the wall 22 totally reflective. An opposite wall 25 is parallel to wall 22 and forms a second reflective window of cell 12. Wall 25 is coated to make the wall partially reflective-in the range of 10-20%. Wall 25 is coated, by means of an electron beam, with a broadband dielectric in the orange-red region of the spectrum. The walls 22 and 25 should be parallel within $\lambda/4$ with a surface quality of $\lambda/10$. Passageway 18 is formed by walls 22 and 25 and by passageway sidewalls 27 and 29 which are interposed between walls 22 and 25 and are generally perpendicular thereto. Sidewalls 27 and 29 are sized to determine the length 1 of passageway 18 (FIG. 4). Length 1 can be between about 10 and about 15 mm, and sidewalls 27 and 29 can be spaced to form a passageway 18 of width w of between about 0.3 and about 0.75 mm. Inlet 16 and outlet 20 can have an inside diameter of about 6 mm. The height of resonator cell 12, as viewed in FIG. 5, can be, for example between 5 and 10 cm. It is important that the flow in passageway 18 be laminar, and to insure laminar flow, the height of cell 12 must be at least 2 cm. All of the structural elements of cell 12 are preferably formed from quartz. Although passageway 18 is disclosed herein as being rectangular in cross section, the passageway can be of a different cross sectional shape. As will be apparent from the discussion which follows, it is important, however, that the cross sectional area of passageway 18 be maintained within certain limits in order to achieve the desired flow rate of the dye solution.

Inlet 16 and outlet 20 are connected to a high pressure pump (not shown) which is adapted to circulate dye solution through the passageway 18 at a pressure in the 50-150 psi range. A representative pump which is suitable for use in the present invention is a C. W. dye laser pump, e. g. a pump manufactured by Spectra-Physics, Model No. 376B.

Useful dye solutions for use with the present invention include Rhodamine 590 or Rhodamine 640 dyes in ethanediol, obtainable from Exciton. Laser apparatus 10 can be turned by selecting a particular dye. Apparatus 10 can be further tuned, when using a selected dye, by using a grating such as, for example, grating 43 in the embodiment of the present invention shown in FIG. 2.

Laser apparatus 10 is particularly suitable for high prf operation with frequencies in the range from 5,000 Hz to 20,000 Hz. Pump laser 14 can be any one of a wide variety of lasers, e. g. nitrogen, excimer, recombination ($Sr^+$, and $Ca^+$), HgBr and copper lasers. For high prf operation, the copper and recombination lasers are particularly well suited. As shown in FIG. 1, pump laser 14 comprises a total reflector 30, a resonator 31, and a partial reflector output coupler 32. The pump laser beam 34 from laser 14 is focused on resonator cell 12 by means of a cylindrical lens 36 having a focal length of 10-20 cm.. One example of a suitable pump laser is a copper vapor laser which emits at 510.5 nm ($^2P_{3/2}-^2D_{5/2}$ transition) and 578.2 nm at ($^2P_{\frac{1}{2}}-^2D_{3/2}$ transition). Output power is in the 1-50 W range at 5-20 kHz prf. A satisfactory prf for the present invention is between about 5 kHz and about 20 KHz, and a preferred prf is 10 kHz.

An important feature of the present invention is the high flow rate of the dye solution which is achieved by pumping dye solution at a high pressure through the relatively narrow passageway 18. The dye solution flow rate in passageway 18 can be calculated using Bernoulli's equation, as follows:

$$P_1+(\tfrac{1}{2})\rho v_1^2+m\rho h_1=P_2+(\tfrac{1}{2})\rho v_2^2 m+\rho h_2 \quad (1)$$

and $$A_1 v_1 = A_2 v_2 \quad (2)$$

where $P_1$, $P_2$ are pressures at point 1, for example, in inlet 16 and at point 2, for example, in passageway 18; $\rho$=density; $v_1$, $v_2$ are velocities at points 1 and 2; m=mass; $h_1$, $h_2$ are heights above a reference plane; and $A_1$, $A_2$ are cross-sectional areas at points 1 and 2. One example of a satisfactory arrangement has been described in the aforementioned article by F. J. Duarte and J. A. Piper where $h_1 \simeq h_2$ and the pressure provided by a commercial pump is $8.27 \times 10^5$ N/m²($\sim$120 psi). Under these conditions, for dye in ethanediol (with a density of $\sim$1 kg/1) flowing from a tubular cross sectional area of 20 mm² into the dye cell having a cross sectional area of 10 mm², the flow speed at the cell was measured to be $\sim$5 ms$^{-1}$. Thus, in order to estimate the likely flow speed in a cell with a 5 mm² cross sectional area we assume an identical system to that of Duarte and Piper and using equation (2), we calculate $v_2$=10 ms$^{-1}$. This flow rate of the dye solution is more than sufficient to accommodate high pulse repetition frequency operation in the 5-20 khz range. A satisfactory range of flow rates for use with the present invention is between about 5 ms$^{-1}$ and about 15 ms$^{-1}$, and a preferred flow rate is about 10 ms$^{-1}$.

In a second embodiment of the invention, shown in FIG. 2, laser apparatus 40 in the form of an oscillator amplifier comprises a resonator cell 42, a grating 41, a multiple prism beam expander 44, a pump laser 46, and an amplifier 54. The multiple prism beam expander 44 and the grating 41 can be constructed, for example, as disclosed in an article entitled "A Double-Prism Beam Expander for Pulsed Dye Lasers," by F. J. Duarte and J. A. Piper in Optics Communications 35, 100 (1980), and in an article entitled "Diffraction-limited single-longitudinal-mode multiple-prism flashlamp-pumped dye laser oscillator: linewidth analysis and injection of amplifier system," by F. J. Duarte and R. W. Conrad in Applied Optics, 26, 2567 (1987). Resonator cell 42 is generally similar to cell 12, except that walls 45 and 43 are placed at an angle b to a plane p which is perpendicular to an axis of propagation of a laser beam 47. Angle b can be, for example, about 77°. A passageway 48 in cell 42 can be between about 0.3 and about 0.7 mm in width. Walls 43 and 45 of resonator cell 42 are uncoated, and the cell 42 includes an external mirror 57 on the output side which serves as a partial reflector output coupler.

Laser beam 47 from resonator cell 42 passes through a lens stop 50, a lens 52, and is directed to amplifier 54. Lens 52 is a mode matching convex lens with a focal length to match the output of the oscillator, including cell 42, to active region 55 of a resonator cell 56 in amplifier 54. Resonator cell 56 is generally similar to resonator cell 42, except that the active region 55 of cell 56 is wider. The walls 59 of cell 56 are not coated with a reflective coating. The width of active region 55 of cell 56 is between about 0.5 and 1.00 mm. Cell 56 can be placed at an angle to a plane which is perpendicular to the axis of propagation of laser beam 47. For example, cell 56 could be disposed in the same manner as cell 62, shown in FIG. 7; that is, cell 56 could be placed at an angle between about 10° and 20° to a plane which is perpendicular to the axis of propagation of laser beam 47. Both cells 42 and 56 are optically pumped by laser 46 which is generally similar to laser 14 shown in FIG. 1. Output from laser 46 passes through a beam splitter 49 which transmits about 30% of the output to cell 42 through a cylindrical lens 53 and deflects about 70% of the output to a mirror 51 which directs the output to cell 56 through a cylindrical lens 58.

In the operation of apparatus 40 in a narrow line width mode, the beam waist of beam 47 should be 0.1 to 0.15 mm at cell 56. Using a magnification factor of about 100, a Littrow grating (5 cm in length) in the fifth order (632 lines per mm) or in the first order (3000 lines pre mm), the line width will be in the 1-2 GHz range. If a differential beam expander is used which expands by a factor of 200 and a longer grating is used, e. g. 10 cm, a line width of 0.5-1 GHz can be obtained. A more complete description of oscillator-amplifiers of the type described herein can be found in the aforementioned article in Applied Optics by Duarte and Piper.

Figure 7:
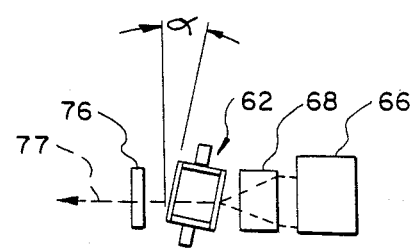
FIG. 7 is an elevational view of the embodiment shown in FIG. 6, viewed along the line 7—7.

In FIGS. 6 and 7, there is shown another embodiment of the present invention in which laser apparatus 60 comprises a resonator cell 62, a pump laser 64, a grating 66, and a multiple beam expander 68. Resonator cell 62 includes a first wall 70 which is formed integrally with the cell 62, and an external mirror 76 on the output side which serves as a partial reflector output coupler. As shown in FIG. 7, cell 62 is placed at an angle alpha to a plane which is perpendicular to the axis of propagation 77 of a laser beam. Cell 62 is placed at an angle to reduce noise in the apparatus 60, and the angle alpha can be between about 10° and about 20°.

The invention has been described in detail with particular reference to preferred embodiments thereof, but it will be understood that variations and modifications can be effected within the spirit and scope of the invention.

I claim:

1. Laser apparatus for producing a laser beam, said apparatus comprising:

a first resonator cell, said cell having first and second walls extending generally in a direction transverse to an axis of propagation of said laser beam, said cell further including a narrow passageway located between said walls and along said axis for receiving a dye solution, and said passageway having a dimension in a direction transverse to said axis of between about 0.3 mm and about 0.75 mm;

a second resonator cell, said second resonator cell having cell walls extending generally in a direction transverse to said axis and a second narrow passageway therein between said cell walls, said second passageway being located to receive a laser beam along said axis from said first resonator cell, and said second passageway having a dimension in a direction transverse to said axis of between about 0.5 mm and about 1.00 mm;

means for circulating a dye solution through said passageways at a flow rate of between about 5 ms$^{-1}$ and about 15 ms$^{-1}$; and pump laser means for delivering a pump laser beam to said cells in a direction transverse to said axis, said pump laser delivering said pump laser beam at a pulse repetition frequency greater than 5,000 pulses per second.

2. Laser apparatus, as defined in claim 1, wherein said walls of the resonator cell are generally parallel.

3. Laser apparatus, as defined in claim 1, wherein a grating and a multiple beam expander are disposed along said axis in a position to interact with said first resonator cell to vary the wavelength of the laser beam produced by said apparatus.

4. Laser apparatus, as defined in claim 1, wherein the walls of said first resonator cell are disposed at an angle to a plane which is perpendicular to said axis.

* * * * *

UNITED STATES PATENT AND TRADEMARK OFFICE
CERTIFICATE OF CORRECTION

PATENT NO. : 4,891,817
DATED : January 2, 1990
INVENTOR(S) : Francisco J. Duarte It is certified that error appears in the above-identified patent and that said Letters Patent is hereby corrected as shown below:

Column 3, line 45, "turned" should read -- tuned --; and
  line 47, "43" should read -- 41 --.
Column 4, line 7, should read $$-- P_1 + (1/2)\rho v_1^2 + m\rho h_1 = P_2 + (1/2)\rho v_2^2 + m\rho h_2 \qquad (1) --.$$

Column 6, lines 31 and 32 should read -- 2. Laser apparatus, as defined in claim 1, wherein said pump laser means includes a pump laser which delivers said pump laser beam at a pulse rate frequency of between about 5,000 and about 20,000 pulses per second. --.

Signed and Sealed this

Twelfth Day of March, 1991

*Attest:*

HARRY F. MANBECK, JR.

*Attesting Officer*     *Commissioner of Patents and Trademarks*